United States Patent [19]

Pannell et al.

[11] Patent Number: 5,109,081

[45] Date of Patent: Apr. 28, 1992

[54] PROCESS FOR CONTINUOUS THERMAL POLYMERIZATION OF CYCLIC HYDROCARBON RESINS USING RECYCLE AS A MEANS OF CONTROLLING MOLECULAR WEIGHT

[75] Inventors: Richard B. Pannell, Kingwood, Tex.; Gerhardt E. Wissler, Al-Jubail, Saudi Arabia

[73] Assignee: Exxon Chemical Patents, Inc., Linden, N.J.

[21] Appl. No.: 635,058

[22] Filed: Dec. 28, 1990

[51] Int. Cl.⁵ .................... C08F 2/06; C08F 279/02; C08G 63/81
[52] U.S. Cl. .................... 526/68; 526/283; 526/308; 524/571
[58] Field of Search ............... 585/502, 507, 508, 600, 585/601; 526/283, 308, 68; 524/571

[56] References Cited

U.S. PATENT DOCUMENTS

| | | | |
|---|---|---|---|
| 2,836,581 | 5/1958 | Gordon | 585/502 |
| 3,084,147 | 4/1963 | Wilks | 526/281 |
| 3,937,674 | 2/1976 | Laarkamp | 526/308 |
| 4,183,833 | 1/1980 | Miyagauchi et al. | 525/221 |
| 4,242,244 | 12/1980 | Malatesta | 524/571 |
| 4,328,090 | 5/1982 | Stuckey, Jr. et al. | 208/44 |

*Primary Examiner*—Anthony McFarlane
*Attorney, Agent, or Firm*—C. L. Bell; M. B. Kurtzman

[57] ABSTRACT

A continuous thermal polymerization process for the manufacture of cyclic hydrocarbon resins. The molecular weight of polymerized cyclic hydrocarbon resins is controlled with selected process temperatures for the feed, selected times in the reactor, and recycle of thermal polymerized product.

9 Claims, No Drawings

PROCESS FOR CONTINUOUS THERMAL POLYMERIZATION OF CYCLIC HYDROCARBON RESINS USING RECYCLE AS A MEANS OF CONTROLLING MOLECULAR WEIGHT

BACKGROUND OF THE INVENTION

It is well known in the art that polymeric hydrocarbon resins are usually made using a non-continuous batch process. It is also well known in the art that recycle or the retention of already formed product resin in a batch reactor during a living thermal polymerization process will have an effect on the final product properties such as increasing the molecular weight as measured by Mz. Recycle is also used in the art for separating component/solvent mixtures, assisting in distillation and product recovery, and for removing unreacted materials. The batch process is slow and labor intensive, however. The batch process requires long preheating periods as well as long fill and drain times. Also, the batch process typically yields only 65% resin product. These factors lead to a high monetary cost for running a batch process. Consequently, the art needed a way to obtain polymerizate in a faster and more cost efficient manner. This need was partially met by the continuous polymerization process. Indeed, it is known in the art that a continuous process reactor can make a large variety of hydrocarbon resins. The benefits, inter alia, are that the same amount of product can be obtained in a shorter time period using smaller equipment. The most noteworthy benefit is the reduction in time required in the reactor. This time reduction is directly related to reducing costs.

The art, however, does not as yet have a continuous means to vary specific product properties of product obtained by living thermal polymerization. Living thermal polymerization is polymerization without catalyst, i.e. heating the thermally polymerizable feed will cause the reactants to polymerize. It is also recognized that an ability to control product properties, such as selectively varying Mn, Mz and Mw, is a highly desirable aspect. It is an object of this invention to provide a continuous thermal polymerization process wherein recycle of product back into the reactor at any point is used to control and selectively increase the product properties especially the mole weight as measured by Mz, Mz being the measure of higher molecular weight materials.

$M_w$ is the weight average molecular weight, $M_n$ is the number average molecular weight and $M_z$ is z-average molecular weight. $M_n$ is generally the measure of the number of molecules present in a sample of interest. (i.e., $M_n$ = total weight of sample divided by number of molecules). $M_w$ is generally a measure of the mass of the sample of interest and is the second power average of molecular weight. $M_z$ is the third power average of molecular weight in a polydisperse polymer.

SUMMARY OF THE INVENTION

It has been discovered that the Mz value of a polycyclic hydrocarbon resin can be increased by recycling a portion of the resin during the polymerization process. A process has been developed for thermal polymerization of cyclodiolefin feedstock where the Mz of the product can be controlled. This process begins by recycling product resin with unreacted monomer to produce a cyclic hydrocarbon resin having a high and controlled Mz value. The process includes passing the feedstock, the reactive portion of which comprises 80% or more methylcyclopentadiene and cyclopentadiene and can also include other thermal polymerizable monomers such as styrenic or aliphatic olefins, through a thermal reactor at preselected increasing temperatures. The feedstock may also contain other olefins, diolefins, or styrenic materials. Antioxidants such as Irganox 1010 (Cieba-Geigy) may also be introduced into the feedstock. The residence time of the feedstock in the reactor as well as the mix of the feedstock components affects the final product profile. The desired content of Mz is increased in the continuous production process by controlling recycle conditions. The amount of recycle may be varied to obtain the desired product profile. For example, a larger fraction of recycled product will produce a resin with a higher Mz.

DETAILED DESCRIPTION OF THE INVENTION

The feedstock comprising cyclic hydrocarbons is polymerized thermally in a continuous reactor, preferably a tubular flow reactor. The cyclic hydrocarbons are heated to at least 180 C, typically in a solvent. The reactor has multiple zones increasing in temperature for thermal polymerization. Molecular weight distribution is controlled by the increasing temperatures of the reactor, preferably a multizone reactor, residence times in the reactor, as well as feedstock components, which would include polymerizable monomer and recycled resin. Typically from 5 to 65 % by volume or preferably from 15 to 40% by volume of the process feedstock coming out of the reactor can be recycled back into the reactor. The fresh feedstock is a mixture of cyclic hydrocarbons such as dicyclopentadiene and methylcyclopentadiene in a solvent. The solvent of choice is toluene or any solvent that is inert in the process and in which the feedstock and product are soluble. The solvent is from about 30 to 50 weight percent of the feedstock. The solvent is mixed with a feed of cyclic hydrocarbons, which in the instant case, comprises from 5 to 10 weight percent of methylcyclopentadiene with a balance of the feedstock made up of 40 to 60 weight percent of cyclopentadiene. The recycle is then added to the fresh feedstock. The feedstock is processed through a reactor in multiple zones of increasing temperature. The feedstock may also contain other olefins, diolefins, or styrenic materials. Antioxidants such as Irganox 1010 (Cieba-Geigy) may also be introduced into the feedstock. The feedstock can also be optionally preheated to the initial zone temperature. The initial zone is at least 180° C. and the final zone is about 300° C. or less. The intermediate heating zone or zones, if present, have a temperature increasing from the initial zone.

The process is run at pressure so as to maintain liquid phase operation. Typical pressure will range up to 600 psi.

After one pass through the reactor the product profile, as is well known in the art, will be based on the ratio of the solvent and cyclic hydrocarbons making up the feedstock, the residence time in the reactor and the temperature(s) inside the reactor. Longer residence time is the reactor can be used to increase molecular weight. The molecular weight also may be increased by higher and varied temperatures in the reactor. The variables of the product profile include the molecular weight distribution as defined by Mn, Mw and/or Mz.

The lowest temperature for thermal polymerization is that at the initial zone of the reactor where the feedstock enters. The minimum temperature should be at least 180° C. Typically the initial temperature is at least 200° C. The final zone is typically from 260° to 300° C. The reactor can have multiple zones, typically having three zones. The intermediate zone or zones having increasing temperatures from the initial zone. In another embodiment a tubular plug flow reactor can be employed such that the temperature increases continuously along the length of the reactor.

During processing, a portion of the product resin is recycled or reintroduced into the reactor. This is accomplished by a continuous process that initiates recycle at any point or zone in the preceding process. Recycle also may be accomplished by introducing the product into the reactor from stored product or other non-continuous means. During the processing time of from about 0.4 to about 3 hours, the monomer and product must be recycled into the reactor and the monomer to resin ratio must be controlled to obtain the desired molecular weight. For example, introducing a higher percent of the product resin into the reactor leads to a higher molecular weight final product. Also, a product that is repeatedly recycled tends to have a higher molecular weight. In addition, longer residence times and/or higher temperatures also lead to higher molecular weight in the recycle phase. To obtain a high molecular weight final product, the ratio of monomer to processed feedstock product being recycled is about 5% to about 60% preferably about 15% to about 40%. The solvent typically used is toluene or any other solvent that is inert in the reaction. The recycle part of the product exiting the reactor acts to increase the weight of the heavy chains. By selectively recycling part of the product resin back into the reactor, longer chains are prepared. This recycle process is an additional process step of the continuous thermal polymerization used to vary the product profile.

EXAMPLES

For recycle operation, the feedstock was prepared to be comprised of 60% by weight of dicyclopentadiene, 10% by weight of methylcyclopentadiene and 30% by weight toluene as a solvent. The feedstock was fed into the reactor which had three temperature zones of 260° C., 285° C. and 290° C. The feed flow rate had an average residence time of 38 minutes per cycle. The recycle is such that 30% of the output was recycled twice after the initial run through. Table I summarizes the results.

TABLE I

| | Recycle Sample Profile | | |
|---|---|---|---|
| | No Recycle | 1st Recycle | 2nd Recycle |
| Mn | 545 | 546 | 575 |
| Mw | 777 | 779 | 993 |
| Mz | 1,418 | 1,890 | 2,309 |

Note that the Mn value in the samples remained fairly constant while there was an increase in the weight of high molecular weight product as measured by Mz.

What is claimed:

1. A continuous thermal polymerization process for producing cyclic hydrocarbon resins comprising the following steps:
   introducing a feedstock comprising a mixture of cyclopentadiene and methylcyclopentadiene in a solvent into a continuous flow reactor having increasing temperatures from entrance to exit; and
   recycling by reintroducing a portion of the effluent back into the reactor.

2. The process of claim 1, wherein the processing time is from about 0.3 hours to about 4.0 hours.

3. The process of claim 1, wherein the continuous flow reactor has an inlet temperature of about 180° C. or higher and an outlet temperature of 300° C. or lower.

4. The process of claim 1, wherein the methylcyclopentadiene comprises from 5 to 10% by weight of the feedstock, the dicyclopentadiene comprises 40 to 50% by weight of the feedstock and the solvent comprises 30 to 50% by weight of the feedstock.

5. The process of claim 1, wherein the reactor is comprised of two or more temperature zones.

6. The process of claim 1, wherein the solvent is toluene.

7. A continuous thermal polymerization process producing cyclic hydrocarbon resins comprising the following steps:
   introducing a feedstock of a mixture of cyclopentadiene and methylcyclopentadiene in a solvent, wherein the methylcyclopentadiene comprises about 5 to about 10% by weight of the feedstock, and the dicyclopentadiene comprises 40 to 60% by weight of the feedstock and the solvent comprises 30 to 50% by weight of the feedstock into a continuous flow reactor with increasing temperature zones, where the processing time of the feedstock in said reactor is from 0.3 to about 4.0 hours and wherein said reactor has an inlet temperature of about 180° C. or higher and an outlet temperature of 300° C. or lower.

8. The process of claim 7, wherein the solvent is toluene.

9. The process of claim 1, wherein the solvent is comprised of aromatic or aliphatic hydrocarbons or both.

* * * * *